(12) United States Patent
Lim

(10) Patent No.: US 8,625,211 B2
(45) Date of Patent: Jan. 7, 2014

(54) VARIABLE MAGNIFICATION DEVICE AND TELESCOPIC SIGHT USING THE SAME

(76) Inventor: Do Hyeon Lim, Masan-si (KR)

(*) Notice: Subject to any disclaimer, the term of this patent is extended or adjusted under 35 U.S.C. 154(b) by 119 days.

(21) Appl. No.: 13/011,728

(22) Filed: Apr. 15, 2011

(65) Prior Publication Data

US 2012/0105951 A1    May 3, 2012

(30) Foreign Application Priority Data

May 4, 2010   (KR) .................. 10-2010-0041935

(51) Int. Cl.
| | | |
|---|---|---|
| G02B 7/02 | (2006.01) | |
| F41G 1/38 | (2006.01) | |
| F41G 1/16 | (2006.01) | |
| G02B 7/10 | (2006.01) | |
| G02B 23/16 | (2006.01) | |
| F41G 1/00 | (2006.01) | |
| G02B 7/04 | (2006.01) | |

(52) U.S. Cl.
CPC .. *F41G 1/16* (2013.01); *G02B 7/10* (2013.01); *G02B 23/16* (2013.01); *F41G 1/00* (2013.01); *G02B 7/04* (2013.01)
USPC ............. 359/812; 359/823; 359/825; 42/119; 42/122

(58) Field of Classification Search
USPC ............. 422/122; 359/812, 823, 825; 42/122, 42/119
See application file for complete search history.

(56) References Cited

U.S. PATENT DOCUMENTS

| | | | | |
|---|---|---|---|---|
| 3,568,324 A | * | 3/1971 | Jorczak ........................... | 42/142 |
| 5,180,875 A | * | 1/1993 | Berry et al. .................... | 42/122 |
| 5,406,733 A | * | 4/1995 | Tarlton et al. .................. | 42/119 |
| 5,521,757 A | * | 5/1996 | Olson .......................... | 359/425 |

* cited by examiner

Primary Examiner — Thomas K Pham
Assistant Examiner — Cara Rakowski
(74) Attorney, Agent, or Firm — John K. Park; Park Law Firm

(57) ABSTRACT

The present invention relates to a variable magnification device and a telescopic sight using the same, and more particularly, to a variable magnification device which is capable of easily adjusting a magnification of a telescopic sight. The variable magnification device includes: a rotation bunch which has a ring shape conforming to the circumference of a barrel of a telescopic sight and includes a bent end formed on one side of the circumference of the rotation bunch; and a rod which is connected to the bent end and is bendable in the longitudinal direction of the barrel. The magnification of the telescopic sight can be adjusted with an aiming posture maintained, thereby allowing immediate hit on a target. In addition, a leverage effect can be used to easily and finely adjust the magnification of the telescopic sight with one hand, thereby preventing distortion of an aiming posture as maximally as possible.

10 Claims, 7 Drawing Sheets

— Prior Art —

VARIABLE MAGNIFICATION DEVICE AND TELESCOPIC SIGHT USING THE SAME

CROSS-REFERENCE TO RELATED APPLICATION

This application claims the benefit of Korean Application No. 10-2010-0041935, filed on May 4, 2010, with the Korean Intellectual Property Office, the disclosure of which is incorporated herein by reference.

BACKGROUND OF THE INVENTION

1. Field of the Invention

The present invention relates to a variable magnification device and a telescopic sight using the same, and more particularly, to a variable magnification device which is capable of easily adjusting a magnification of a telescopic sight under a condition where a shooter aims for a target with a telescopic sight, and a telescopic sight using the same.

2. Description of the Related Art

A telescopic sight refers to a sighting telescope which is a device which magnifies and aims for a remote target precisely with it attached to a firearm such as a rifle As used therein, the term "rifle" refers to a personal firearm which has a bored barrel loaded with bullets, shoots with it put on a shoulder of a shooter, and which is capable of hitting a target precisely with an elaborative sight Such sight of the rifle is generally obtained by alignment of a line of sight aimed at a target, which is an important step of determining precise shooting in which a front sight located at an end of barrel is aligned with a back sight located in a main body of the rifle.

However, since the front sight and the back sight are very small and their alignment may be in disorder due to small shaking, a shooter requires extreme concentration for alignment of the line of sight.

In addition, as the shooter is excessively concerned about the alignment of the line of sight, the shooter's eyes are focused on the front sight and the back sight rather than the target and forward situations, which results in a narrow field of vision.

In addition, the line-of-sight alignment takes a relatively long time, which is against the nature of shooting that a secured target has to be instantaneously hit.

Accordingly, to overcome these problems, in the related art, a telescopic sight has been attached to a rifle.

Such a telescopic sight eliminates the need of separate line-of-sight alignment by adding coordinate lines or points to the telescopic principle and can aim at a remote target by increasing a magnification from low to high.

A structure of this telescopic sight will be described in brief below with reference to FIG. 1.

A conventional telescopic sight may have a body consisting of a series of objective barrel 10, middle barrel 20 and ocular barrel 30. The objective barrel 10 includes an objective bunch 11, the middle barrel 20 includes a creak bunch 21 and an internal bunch 23, and the ocular barrel 30 includes an ocular bunch 31 and a reticle bunch 33.

Optical lenses are respectively mounted within the objective bunch 11, the internal bunch 23 and the ocular bunch 31 and a zoom lens 25 is mounted within the internal bunch 23.

The zoom lens 25 is moved by a zoom front wheel rotated along the circumference of the middle barrel 20, thereby changing a magnification of the telescopic sight.

That is, the magnification of the telescopic sight is adjusted by the rotation of the zoom front wheel 27.

However, it is difficult for the zoom front wheel 27 to be rotated at an aiming posture.

This is because it is not easy to find a position of the zoom front wheel 27 only with the feel of hands at the aiming posture at which the eye is concentrated on the inside of the ocular barrel 30.

In addition, it is difficult for the zoom front wheel 27 to turn with one hand since it is stiffly mounted such that it is not randomly rotated by shooting vibration of the rifle.

In the end, the shooter has to turn the zoom front wheel 27 with one hand after the shooter takes his/her eye off the ocular barrel 30 and distracts his/her aiming posture.

Moreover, the zoom front wheel 27 has to be finely turned with one hand for an elaborate focus adjustment, which is not an easy work in the aiming posture.

SUMMARY OF THE INVENTION

In the light of the above circumstances, it is an object of the present invention to provide a variable magnification device which is capable of easily adjusting a magnification of a telescopic sight with one hand of a shooter in an aiming posture where a rifle is put on a shoulder of the shooter, and a telescopic sight using the same.

It is another object of the present invention to provide a variable magnification device which is capable of easily adjusting a focus of a telescopic sight, and a telescopic sight using the same.

To achieve the above objects, according to an aspect of the invention, there is provided a variable magnification device including: a rotation bunch which has a ring shape conforming to the circumference of a barrel of a telescopic sight and includes a bent end formed on one side of the circumference of the rotation bunch; and a rod which is connected to the bent end and is bendable in the longitudinal direction of the barrel.

Preferably, the bent end includes a body which projects upwardly from the rotation bunch, provides a space in which a tail end of the rod is accommodated, and includes an opened upper portion and one opened lateral perpendicular to the longitudinal direction of the barrel and a shaft which traverses both laterals adjacent to the one lateral, wherein the rod is adapted to be rotated around the shaft.

Preferably, an inner side of the body, which is perpendicular to the longitudinal direction of the barrel, extends upwardly from the rotation bunch.

Preferably, the variable magnification device further includes an elastic means mounted within the bent end and a horizontal pushing end which is placed above the elastic means and contacts the tail end of the rod.

Preferably, an end edge of the rod is beveled.

According to another aspect of the invention, there is provided a telescopic sight including: the above-described variable magnification device; a barrel mounted with the variable magnification device; and a zoom lens which is mounted within the barrel and is horizontally moved based on adjustment of the variable magnification device.

The present invention has an advantage in that the magnification of the telescopic sight can be adjusted with an aiming posture maintained, thereby allowing immediate hit on a target.

The present invention has another advantage in that a leverage effect can be used to easily and finely adjust the magnification of the telescopic sight with one hand, thereby preventing distortion of an aiming posture as maximally as possible.

The present invention has another advantage in that the rod provided to apply the leverage effect can be bent and laid down along the barrel of the telescopic sight for easy receipt.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
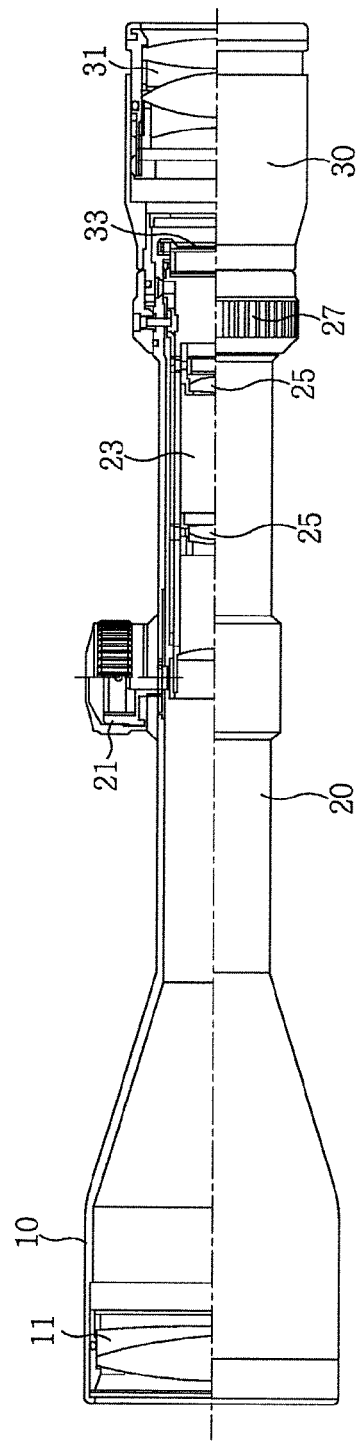
FIG. 1 is a partial sectional view showing a conventional telescopic sight.

Hereinafter, preferred embodiments of the present invention will be described in detail with reference to the accompanying drawings. In the following detailed description of the present invention, concrete description on related functions or constructions which was shown in FIG. 1 will be omitted if it is deemed that the functions and/or constructions may unnecessarily obscure the gist of the present invention.

Figure 2:
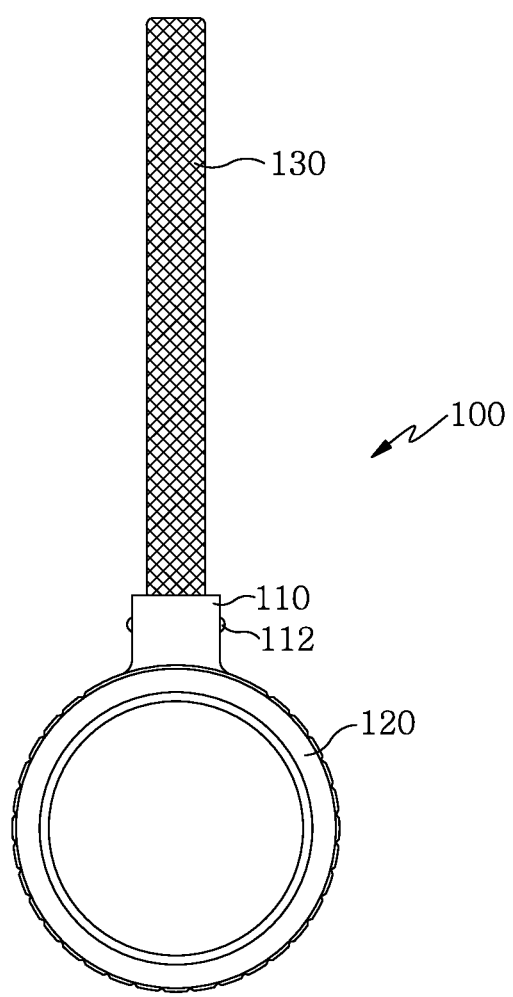
FIG. 2 is a front view showing a variable magnification device according to an embodiment of the present invention.

As shown in FIG. 2, a variable magnification device 100 includes a rotation bunch 120 having a bent end 110 placed at one side of its circumference, and a rod 130 connected to the bent end 110.

Figure 3:
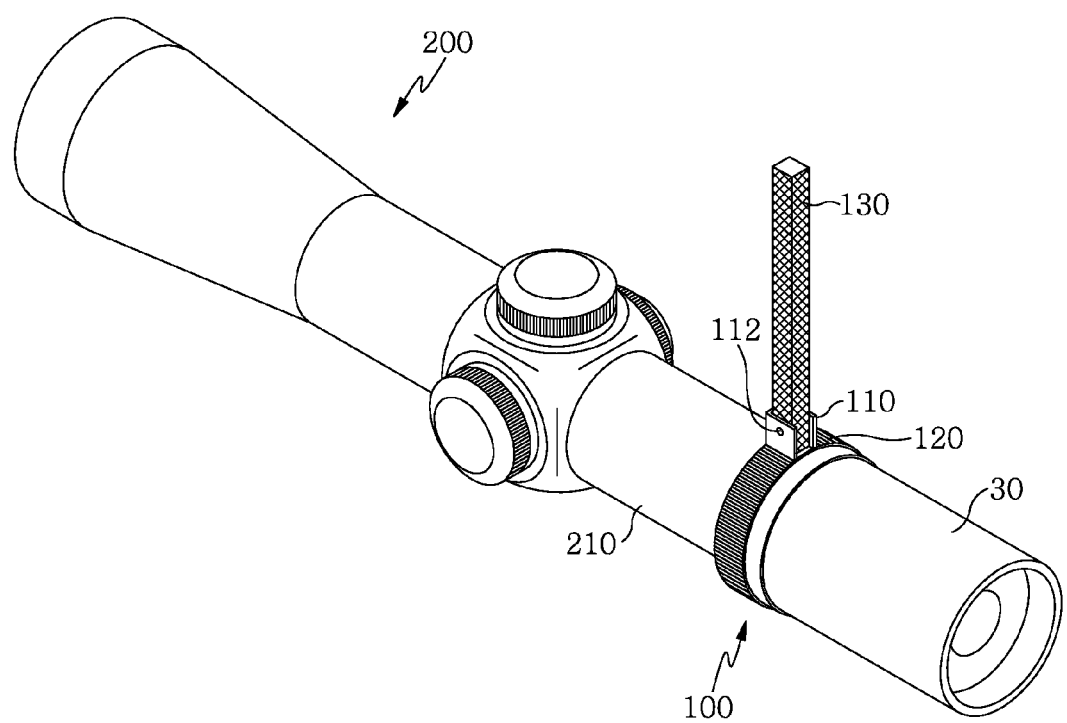
FIG. 3 is a perspective view showing a telescopic sight using the variable magnification device according to an embodiment of the present invention.

As shown in FIG. 3, in the variable magnification device 100, a zoom front wheel 27 is combined at the same position as the conventional zoom front wheel 27 in a barrel of a telescopic sight 200.

Accordingly, when the rotation bunch 120 is rotated, a zoom lens 25 within a barrel 210 is horizontally moved.

In this case, the rod 130 acts as a handle to rotate the rotation bunch 120 easily.

Accordingly, in the variable magnification device 100, since the rotation bunch 120 can be easily rotated with the rod 130 held with one hand, a magnification of the telescopic sight 200 can be easily adjusted with one hand without distracting an aiming posture.

As a result, it is possible to quickly hit a target after magnification adjustment with aim at the target maintained when the magnification of the telescopic sight is adjusted.

In addition, the rod 130 is bent to face the barrel 210 of the telescopic sight 200.

Accordingly, the rod 130 is closely adhered to or similarly placed on the barrel 210, which facilitates receipt of the telescopic sight 200 or a rifle (not shown) attached with the telescopic sight 200.

In this embodiment, preferably, the variable magnification device 100 may be a part of the telescopic sight 200, which is incorporated into the telescopic sight 200, without separate attachment/detachment.

Details of the variable magnification device 100 will be described below.

The rotation bunch 120 is placed on the circumference of the barrel 210 in order to adjust the magnification of the telescopic sight 200, like the conventional zoom front wheel 27, and is rotated along the circumference to horizontally move the zoom lens 25 placed within the telescopic sight 200. Preferably, as shown in FIG. 2, the rotation bunch has a ring shape surrounding the circumference of the barrel 210 of the telescopic sight 200.

In this case, the bent end is placed at one side of the circumference of the rotation bunch 120.

The rotation bunch 120 is tightly mounted on the circumference of the barrel 210 to prevent the rotation bunch 120 from being randomly rotated due to shooting vibration of the rifle.

Figure 4:
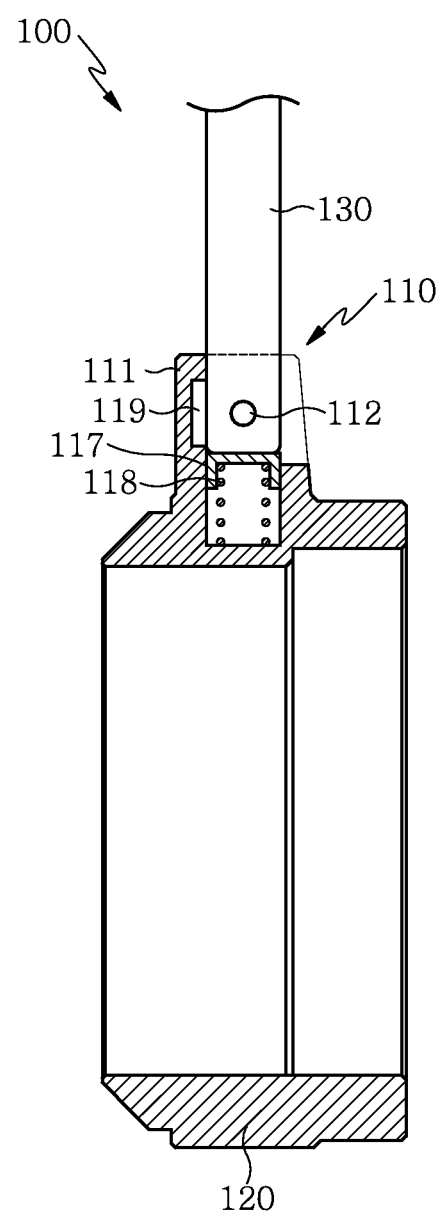
FIG. 4 is a side sectional view showing a variable magnification device according to an embodiment of the present invention.

The bent end 110 connects the rod 130 to the rotation bunch 120 in a bendable manner. Preferably, as shown in FIG. 4, the bent end 110 includes a body which projects upwardly from the rotation bunch 120 and provides an internal space in which a tail end of the rod 130 is accommodated.

In this case, the body 111 includes an opened upper portion, an opened lateral perpendicular to the longitudinal direction of the barrel 210, and a shaft 112 traversing both laterals adjacent to the one lateral.

Figure 5:
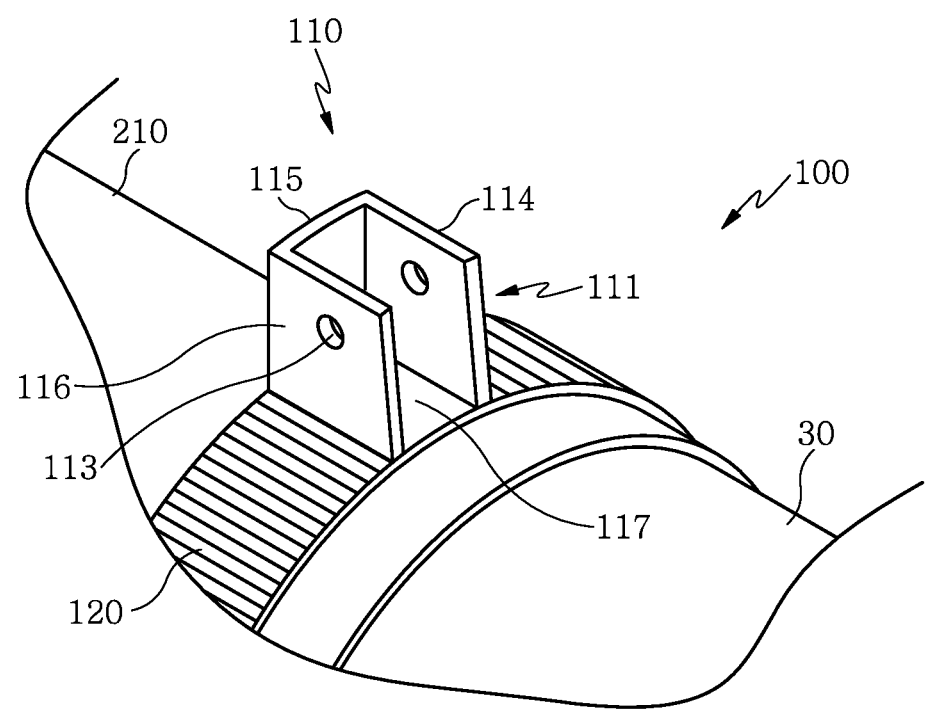
FIG. 5 is a perspective view showing a bent end of a variable magnification device according to an embodiment of the present invention.

To this end, as shown in FIG. 5, the body 111 includes first, second and third side walls 114, 115 and 116 which are placed in three laterals except the one lateral and project upwardly by a predetermined length from one side of the circumference of the rotation bunch 120, and a through hole 113 in which the shaft 112 is horizontally fixed to the first and third side walls 114 and 116.

Accordingly, the tail end of the rod 130 is accommodated between the first, second and third side walls 114, 115 and 116 and the rod 130 is connected to the shaft 112 and is rotated to stand in the opened upper portion or lie in the one lateral.

In this case, preferably, the rod 130 is configured to have a predetermined length to allow it to be easily held and rotated with one hand, such that it does not project outwardly beyond the ocular barrel 30 when it lies along the longitudinal direction of the telescopic sight 200.

As a result, the rod 130 acts as a handle to turn the rotation bunch 120 when it stands up, and is closely adhered to or similarly placed on the barrel 210 of the telescopic sight 200 for easy receipt when it lies down.

In this case, preferably, the second side wall 115 provides an inner side extending upwardly from the rotation bunch 120, so that the second side wall 115 can support the erected rod 130, with one side of the erected rod 130 closely adhered to the inner side.

In addition, preferably, a gap between the first and third side walls 114 and 116 corresponds to a width of the rod 130. Accordingly, when a force is exerted on the rod 130 to turn the rotation bunch 120, a rotation force can be delivered to the rotation bunch 120 with no gap.

In addition, preferably, the shaft 112 passes through the first and third side walls 114 and 116 and the tail end of the rod 130 and the rod 130 is tightly connected to the shaft 112 to prevent the rod 130 from being randomly bent due to shooting vibration of the rifle.

Further, preferably, a pushing end 117 may be provided to prevent the rod 130 from being randomly rotated.

The pushing end 117 is mounted and vertically moved in the inside of the bent end 110 and receives a pushing-up force from an elastic means 118 provided below the pushing end 117.

In this case, preferably, the elastic means 118 is a compression spring.

In correspondence, preferably, the tail end of the rod 130 has right-angled edges and an end face 131 or lateral face 132 of the tail end is closely adhered to the pushing end 117 when the rod 130 is rotated.

Accordingly, the pushing end 117 receives an elastic force from the elastic means 118, pushes up the end face 131 when the rod 130 is erected, thereby fixing the erected rod 130, and pushes up the lateral face 132 when the rod 130 is horizontally bent, thereby fixing the rod 130 horizontally.

Figure 6:
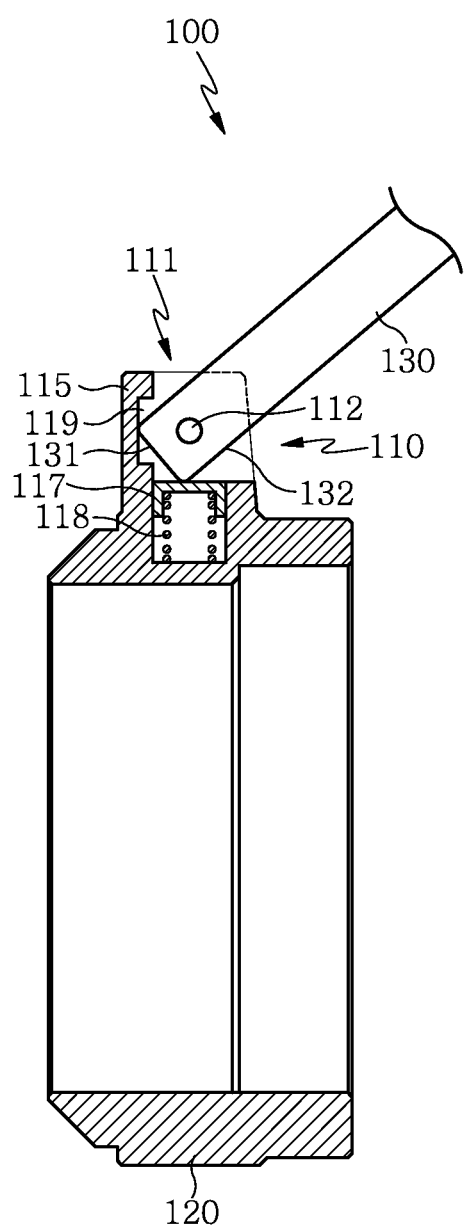
FIG. 6 is a side sectional view showing an operation state of a variable magnification device according to an embodiment of the present invention.

In this case, as shown in FIG. 6, preferably, a running groove 119 may be formed in the inner side of the second side wall 115 such that the angled edges of the rod 130 are rotated without collision. Alternatively, without the running groove 119, the angled edges of the rod 130 may be beveled with a predetermined width.

Accordingly, while the rod 130 is rotated around the shaft 112 by the pushing end 117, the rod 130 can be fixed to take two horizontal and vertical postures and maintain these postures against the shooting vibration of the rifle.

Although it has been illustrated in the above that the bent end 110 is formed to project from the rotation bunch 120, the rotation bunch 120 may be formed to be thick and the bend end 110 may be formed to be indented into one side of the rotation bunch 120.

Hereinafter, an operation state of the variable magnification device 100 and the telescopic sight 200 using the same will be described. The following description will be given with reference to FIG. 7 in conjunction with FIGS. 1 to 6, in which the like elements are denoted by the same reference numerals.

First, prior to putting the rifle on a shoulder for shooting, the rod 130 is rotated and erected t be closely adhered to the inner side of the second side wall 115.

Under this state, when a target is captured, an aiming posture aiming the target through the telescopic sight 200 with a neck of the rifle (not shown) grasped with one hand is taken, and then the rod 130 is rotated with the other hand to adjust the magnification and focus of the telescopic sight 200.

Thereafter, upon completion of the adjustment, a trigger is pulled to hit the target.

In this case, if a different target is captured at a different position and a different distance, with the rifle (not shown) aimed at the different target, the rod 130 is again rotated with one hand to adjust the magnification and focus of the telescopic sight 200, so that the different target can be immediately hit.

Accordingly, the shooter can immediately readjust the magnification and focus of the telescopic sight 200 based on a position and distance of a target for shooting by rotating the rod 130 with one hand with the rifle (not shown) put on the shoulder.

Figure 7:
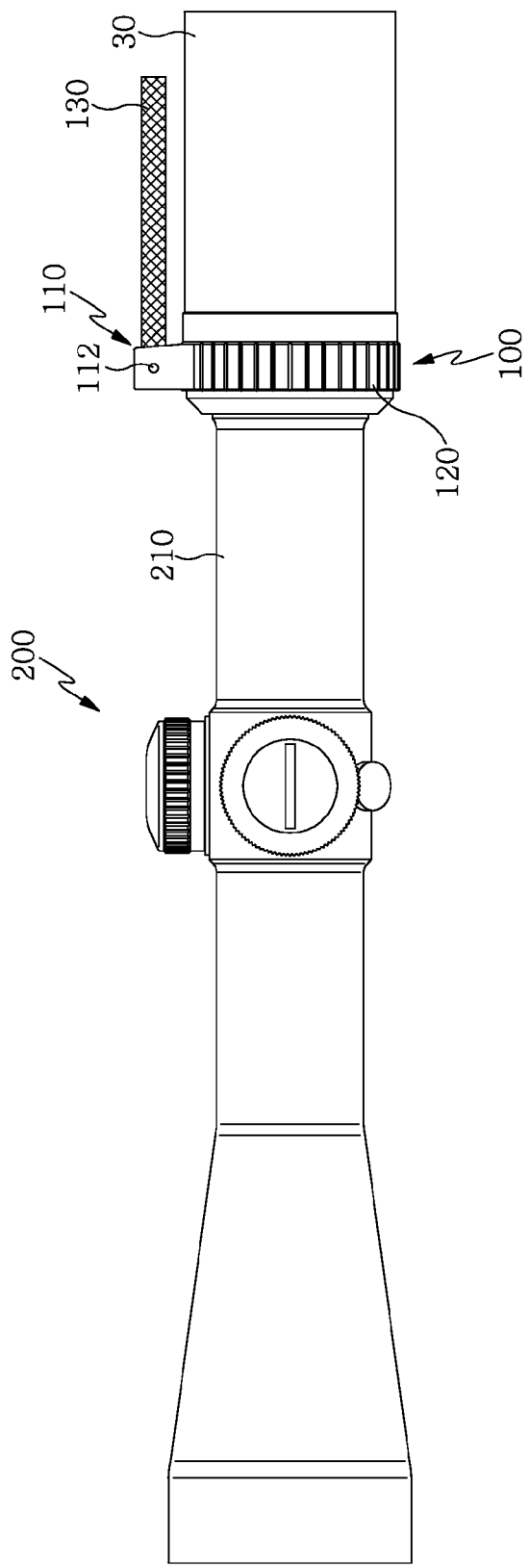
FIG. 7 is a perspective view showing an operation state for receipt of a telescopic sight using a variable magnification device according to an embodiment of the present invention.

After completion of shooting through this procedure, as shown in FIG. 7, the rod 130 can be folded not to get in the way when the telescopic sight 200 or the rifle (not shown) attached with the telescopic sight 200 is moved or stored.

In addition, this facilitates receipt of the telescopic sight 200 or the rifle (not shown) attached with the telescopic sight 200 in a case.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A variable magnification device (100) comprising:
a rotation bunch (120) which has a ring shape conforming to the circumference of a barrel (210) of a telescopic sight (200) and includes a bent end (110) formed monolithically on one side of the circumference of the rotation bunch (120);
a rod (130) which is rotatably connected to the bent end (110) and is rotatable in the longitudinal direction of the barrel (210);
wherein the bent end (110) comprises:
a body (111) which projects upwardly from the rotation bunch (120), provides a space in which a tail end of the rod (130) is accommodated, and includes an opened upper portion and one opened lateral perpendicular to the longitudinal direction of the barrel (210); and
a shaft (112) which traverses two laterals adjacent to the one opened lateral, wherein the rod (130) is adapted to be rotated around the shaft (112), and wherein the body (111) comprises:
a first side wall (114) and a third side wall (116) 25 which are parallel with the longitudinal direction of the barrel (210) and a through hole (113) is respectively formed on the first and third side walls (114) and (116) such that the shaft (112) is horizontally fixed to the first and third side walls (114) and (116); and
a second side wall (115) connecting the first and third side walls (114) and (116) providing the space, the second side wall (115) supporting the rod (130) when the rod (130) is being rotated.

2. The variable magnification device (100) according to claim 1, wherein an inner side of the body (111), which is perpendicular to the longitudinal direction of the barrel (210), extends upwardly from the rotation bunch (120).

3. The variable magnification device (100) according to claim 1, wherein an end edge of the rod (130) is beveled.

4. The variable magnification device (100) according to claim 1, wherein a running groove (119) is formed on the inner side of the second side wall (115).

5. A telescopic sight (200) comprising:
a variable magnification device (100) comprising: a rotation bunch (120) which has a ring shape conforming to the circumference of a barrel (210) of a telescopic sight (200) and includes a bent end (110) formed monolithically on one side of the circumference of the rotation bunch (120); a rod (130) which is rotatably connected to the bent end (110) and is rotatable in the longitudinal direction of the barrel (210); an elastic means (118) mounted within the bent end (110); and a horizontal pushing end (117) which is placed above the elastic means (118) and contacts the tail end of the rod (130), wherein an end edge of the rod (130) is beveled;
a barrel (210) mounted with the variable magnification device (100); and
a zoom lens (25) which is mounted within the barrel (210) and is horizontally moved based on adjustment of the variable magnification device (100),
wherein the bent end (110) comprises:

a body (111) which projects upwardly from the rotation bunch (120), provides a space in which a tail end of the rod (130) is accommodated, and includes an opened upper portion and one opened lateral perpendicular to the longitudinal direction of the barrel (210); and a shaft (112) which traverses two laterals adjacent to the one opened lateral, wherein the rod (130) is adapted to be rotated around the shaft (112), and wherein the body (111) comprises:

a first side wall (114) and a third side wall (116) 25 which are parallel with the longitudinal direction of the barrel (210) and a through hole (113) is respectively formed on the first and third side walls (114) and (116) such that the shaft (112) is horizontally fixed to the first and third side walls (114) and (116); and a second side wall (115) connecting the first and third side walls (114) and (116) providing the space, the second side wall (115) supporting the rod (130) when the rod (130) is being rotated.

6. The telescopic sight (200) according to claim 5, wherein a running groove (119) is formed on the inner side of the second side wall (115).

7. A telescopic sight (200) comprising:
a variable magnification device (100) comprising: a rotation bunch (120) which has a ring shape conforming to the circumference of a barrel (210) of a telescopic sight (200) and includes a bent end (110) formed monolithically on one side of the circumference of the rotation bunch (120); a rod (130) which is rotatably connected to the bent end (110) and is rotatable in the longitudinal direction of the barrel (210); an elastic means (118) mounted within the bent end (110); and a horizontal pushing end (117) which is placed above the elastic means (118) and contacts the tail end of the rod (130);
a barrel (210) mounted with the variable magnification device (100); and
a zoom lens (25) which is mounted within the barrel (210) and is horizontally moved based on adjustment of the variable magnification device (100),
wherein the bent end (110) comprises:
a body (111) which projects upwardly from the rotation bunch (120), provides a space in which a tail end of the rod (130) is accommodated, and includes an opened upper portion and one opened lateral perpendicular to the longitudinal direction of the barrel (210); and
a shaft (112) which traverses two laterals adjacent to the one opened lateral, wherein the rod (130) is adapted to be rotated around the shaft (112), and wherein the body (111) comprises:
a first side wall (114) and a third side wall (116) 25 which are parallel with the longitudinal direction of the barrel (210) and a through hole (113) is respectively formed on the first and third side walls (114) and (116) such that the shaft (112) is horizontally fixed to the first and third side walls (114) and (116); and
a second side wall (115) connecting the first and third side walls (114) and (116) providing the space, the second side wall (115) supporting the rod (130) when the rod (130) is being rotated.

8. The telescopic sight (200) according to claim 7, wherein a running groove (119) is formed on the inner side of the second side wall (115).

9. A telescopic sight (200) comprising:
a variable magnification device (100) comprising: a rotation bunch (120) which has a ring shape conforming to the circumference of a barrel (210) of a telescopic sight (200) and includes a bent end (110) formed monolithically on one side of the circumference of the rotation bunch (120); a rod (130) which is rotatably connected to the bent end (110) and is rotatable in the longitudinal direction of the barrel (210); an elastic means (118) mounted within the bent end (110); and a horizontal pushing end (117) which is placed above the elastic means (118) and contacts the tail end of the rod (130);
a barrel (210) mounted with the variable magnification device (100); and
a zoom lens (25) which is mounted within the barrel (210) and is horizontally moved based on adjustment of the variable magnification device (100),
wherein the bent end (110) comprises:
a body (111) which projects upwardly from the rotation bunch (120), provides a space in which a tail end of the rod (130) is accommodated, and includes an opened upper portion and one opened lateral perpendicular to the longitudinal direction of the barrel (210); and
a shaft (112) which traverses two laterals adjacent to the one opened lateral, wherein the rod (130) is adapted to be rotated around the shaft (112), and wherein the body (111) comprises:
a first side wall (114) and a third side wall (116) 25 which are parallel with the longitudinal direction of the barrel (210) and a through hole (113) is respectively formed on the first and third side walls (114) and (116) such that the shaft (112) is horizontally fixed to the first and third side walls (114) and (116); and
a second side wall (115) connecting the first and third side walls (114) and (116) providing the space, the second side wall (115) supporting the rod (130) when the rod (130) is being rotated, and
wherein an inner side of the body (111), which is perpendicular to the longitudinal direction of the barrel (210), extends upwardly from the rotation bunch (120).

10. The telescopic sight (200) according to claim 9, wherein a running groove (119) is formed on the inner side of the second side wall (115).

* * * * *